Dec. 24, 1968 G. F. LEWIS 3,418,021
BELT RETRACTING DEVICE WITH COLLET LOCKING MEANS
Filed April 19, 1967
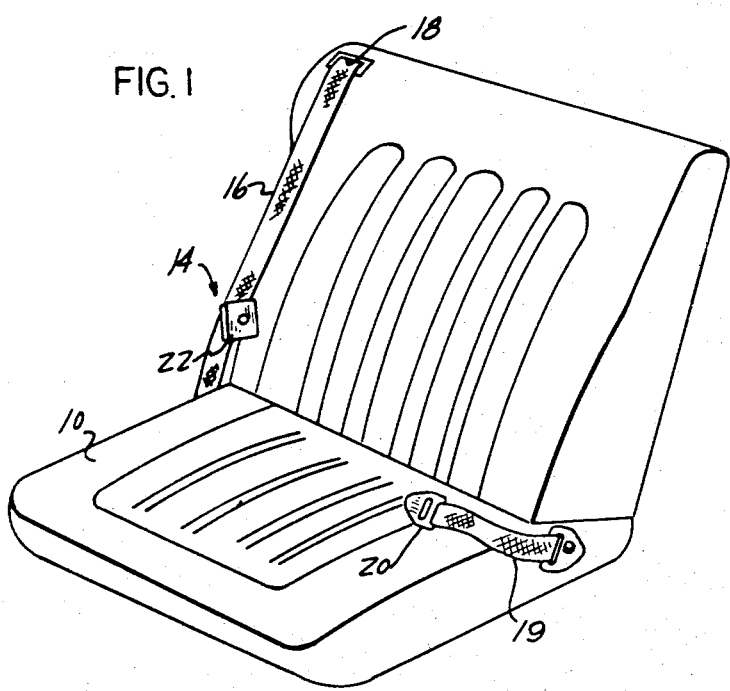
FIG. 1
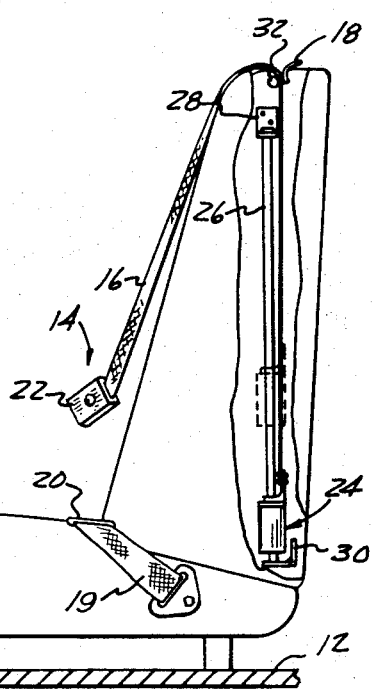
FIG. 2
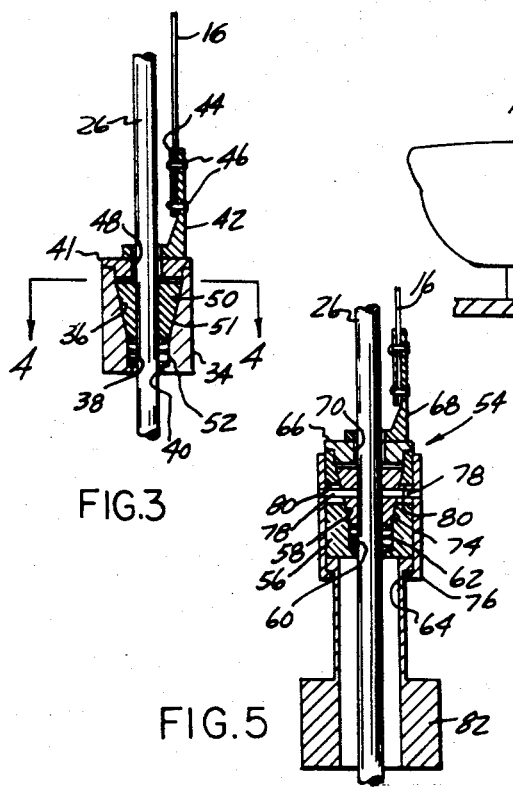
FIG. 3
FIG. 5
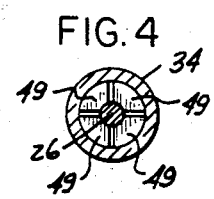
FIG. 4
INVENTOR
GERALD F. LEWIS
BY Hauke, Kess, & Gifford
ATTORNEYS

United States Patent Office 3,418,021
Patented Dec. 24, 1968

3,418,021
BELT RETRACTING DEVICE WITH COLLET LOCKING MEANS
Gerald F. Lewis, Berkley, Mich., assignor to Jim Robbins Seat Belt Co., Royal Oak, Mich.
Filed Apr. 19, 1967, Ser. No. 632,092
9 Claims. (Cl. 297—388)

ABSTRACT OF THE DISCLOSURE

A device for controlling the extension and retraction of a vehicle safety seat belt from a stored position. A locking unit, attached to the stored end of the belt, is slidably mounted on an elongated vertical rod fixed to the vehicle. The locking unit moves upwardly to permit the belt to be extended upon the application of a normal pull-out force. The weight of the locking unit provides a downward retracting force on the belt.

The locking unit comprises a pair of interconnected, coaxial sleeves having tapered surfaces engaging one another when an abnormal pull-out force is appleid to the belt. The inner sleeve has an axially slotted portion which clamps the locking unit to the rod upon engagement of the tapered surfaces. A spring disengages the sleeves when the abnormal pull-out force has been relieved from the belt.

Background of the invention (*I*) *Field of the invention.*—This invention relates to vehicle safety seat belt devices and more specifically to a device permitting an unrestrained extension of the belt from its stored position in response to the application of a normal tensile force to the belt, but which reacts to the application of a predetermined force by locking the belt to a fixed section of the vehicle to prevent further extension.

(*II*) *Description of the prior art.*—Various vehicle safety seat belt arrangements are currently employed in moden vehicles as a means for restraining the movement of an occupant from his seat upon a sudden change in momentum of the vehicle. The object of these belt arrangements is to prevent an uncontrolled movement of the occupant from his seat tending to bring him into contact with various injury producing non-yieding sections of the vehicle interior. Until recently such seat belt devices have ben accepted with a great reluctance on the part of the general public. The reason for this reluctance is that when the restraining sections of conventional seat belts are joined together, the encircled occupant is restrained from performing normal body movements.

To overome the aforementioned objections, various devices have been disclosed in the prior art which permit the unrestrained extension and retraction of the belt from a stored position to accommodate normal movements of the occupant but which have some form of locking device, responsive to the application of a predetermined force to the belt, to lock the extended section of the belt to a fixed part of the vehicle. In general, such prior art devices have taken the form of a rotating retractor device having a locking means operable to lock a spring biased wind-up reel against rotation when an inertia member is displaced from a normal position in reaction to the centrifugal force produced by an excessive rotational feed-out rate. Such devices have received a poor reception because of the large number of component parts which are expensive to manufacture and which are unreliable in actual use.

The term "predetermined force" in this application refers to that force acting on the belt which produces a predetermined feed-out rate of the belt from its stored position. It is normally caused by forces acting on the vehicle and tending to suddenly displace the occupant from his seat. The displacing movement produces a pull-out force on the belt.

The preferred embodiment of the present invention obviates the problems of the prior art by providing a belt locking and retracting device which is slidably mounted on a rod attached to the vehicle. The device is attached to the stored end of the belt and moves on the rod when a normal pull-out force is applied to the belt, but clamps the belt to the rod when the pull-out force exceeds a predetermined level.

Summary

The preferred embodiment of the present invention, which will be subsequently described in greater detail, is described with reference to a seat assembly having a belt section movable into and out of a storage area in the back supporting portion of the seat. A vertical rod is rigidly connected to the seat frame. A locking unit is axially slidably mounted on the rod for movement between a raised position and a lowered position. The end of the seat belt is fastened to the locking unit and extends upwardly through guide means arranged at the upper portion of the seat. A normal pull-out force on the belt moves the locking device upwardly to permit feed-out of the belt from the storage area. When the pull-out force is relaxed, the locking device slides downwardly on the rod and withdraws the belt into the storage area.

The locking unit preferably comprises a longitudinally slotted inner sleeve having radially compressible sections forming a bore. The inner sleeve is mounted on the rod with the bore assuming a normal diameter for axial slidable movement. An outer coaxial sleeve has a tapered bore engageable with externally tapered surfaces of the inner sleeve. A spring provides an axial bias between the two sleeves so that their tapered surfaces are normally disengaged. The end of the belt is attached to the outer sleeve and arranged so that a tensile force acting on the belt moves the two sleeves toward engagement. A predetermined tensile force applied to the belt acts on the tapered surfaces of the two sleeves so that the slotted sections of the inner sleeve are compressed into clamping engagement with the rod thereby preventing further extension of the belt.

Preferably a counterweight having a predetermined mass is attached to the inner sleeve so that when the locking unit is in the unclamped condition, the counterweight applies a retracting force on the belt.

The preferred embodiment of the present invention has several distinct advantages over the seat belt devices of the prior art including its overall simplicity which contributes toward reliable operation and economical manufacture. In addition, the counterweight retracting means provides a uniform retracting force throughout the full extension of the belt.

It is therefore an object of the present invention to provide a seat belt retracting device permitting a relatively unrestrained movement of the belt in response to a pull-out force less than a predetermined force but which responds to a predetermined pull-out force by clamping the belt to a fixed part of the vehicle.

It is another object of the present invention to provide an improved seat belt device for connecting the end of a belt to a structural part of the vehicle by providing a locking unit attached to the end of the belt and mounted for slidable movement on an elongated rod fixed to the vehicle, the locking unit having a first condition wherein it slides on the rod to permit extension and retraction of the belt and a second condition wherein it clamps the belt to the rod to prevent extension.

It is another object of the present invention to provide a seat belt-device for retracting a vehicle seat belt into a stored position wherein the belt is stored in a linear arrangement by providing an elongated rod fixed to the vehicle, a retracting device mounted to the rod for up and down movement between a lowered position corresponding to a fully stored belt position and an upper position corresponding to a fully extended belt position, the retracting device having a mass tending to bias the belt toward the lowered stored position and the retracting device further having a pair of cooperating locking members responsive to a force tending to produce an excessive feed out of the belt by clamping the end of the belt to the rod.

It is a still further object of the present invention to provide means for locking a section of an extendible vehicle seat belt section to a fixed section of the vehicle comprising a pair of interconnected coaxial sleeve elements having interengageable tapered surfaces, the inner sleeve having slotted portions slidably mounted on a rod fixed to the vehicle, the outer sleeve attached to the belt section and means moving the sleeves into engagement upon the application of a predetermined tensile force on the belt so that the inner sleeve clamps the belt section to the rod.

Still further objects and advantages of the present invention will readily occur to one skilled in the art to which the invention pertains upon reference to the following detailed description.

*Description of the drawings*

The description refers to the accompanying drawing in which like reference characters refer to like parts throughout the several views and in which:

FIGURE 1 is a perspective view of a vehicle seat assembly employing a belting arrangement for controlling the movements of an occupant of the seat;

FIGURE 2 is a side elevational view of the seat assembly of FIGURE 1, with parts of the back supporting portion broken away to show a seat belt retractor device illustrating the preferred embodiment of the present invention;

FIGURE 3 is an enlarged sectional view of the preferred locking unit illustrated in FIGURE 2;

FIGURE 4 is a view taken along lines 4—4 of FIGURE 3; and

FIGURE 5 is a sectional view illustrating an alternative embodiment of the present invention.

*Description of the preferred embodiment*

Now referring to FIGURES 1 and 2, a seat assembly 10 is illustrated as mounted to the floor 12 of a vehicle and employing an occupant restraining system 14 for controlling the movements of an occupant of seat 10.

The occupant restraining system 14 includes an elongated belt section 16 having its lower end rigidly anchored to the horizontal portion of the seat assembly 10 and its upper end extendible through an aperture 18 from a stored position in the back supporting portion of the seat assembly 10. A second short belt portion 19 is anchored to the horizontal portion of the seat assembly 10 and has an upper end attached to a tongue section 20 which is engageable with a buckle section 22 carried by the belt 16.

As can best be seen in FIGURE 2, the upper section of the belt 16 extends through the aperture 18 and downwardly for attachment to a locking unit 24. An elongated vertical rod 26 having its upper end rigidly mounted to a vehicle frame section 28 and its lower end rigidly mounted to a vehicle frame section 30 is arranged below the aperture 18. The locking unit 24 is mounted on the rod 26 and is normally movable up and down with respect to the rod 26 so that the restraining portion of the belt 16 can be freely extended in response to normal body movements of the occupant. Preferably a roller 32 mounted adjacent the aperture 18 provides an anti-friction guide for the movement of the belt 16.

As can best be seen in FIGURES 3 and 4, the locking unit 24 comprises an outer sleeve 34 having an internally tapered bore section 36. The lower narrow end of the tapered section 36 extends into a cylindrical bore section 38 which terminates with a bore 40. The bore 40 is slidably mounted on the rod 26.

The upper wide end of the tapered section 36 is closed off by a cap element 41 which is joined to the sleeve 34 by suitable fastening means such as threaded means or the like. A bracket 42 joined to the cap 41 is clamped to the end of the belt 16 by clamping plate 44 and fasteners 46. The cap 41 and the bracket 42 have a bore 48 providing a sliding engagement with the rod 26. Thus, it can be seen that the belt 16, the bracket 42, the cap 40 and the sleeve 34 move as a unit with respect to the rod 26.

An inner sleeve 50 is coaxially disposed within the outer sleeve 34 and has a plurality of axially slotted sections 49 (FIG. 4) and is provided with a bore which is normally slidably engageable with the rod 26. The outer surface 51 of the inner sleeve has a taper corresponding to the internal taper 36 of the outer sleeve 34.

The inner sleeve 50 is axially displaceable within the outer sleeve 34 between a disengaged position wherein their tapered surfaces are substantially separated and an engaged position wherein the tapered bore 36 of the outer sleeve produces a compressive force on the slotted sections 49 so that they clamp the inner sleeve 50 to the rod 26.

A cylindrical spring 52 arranged below the narrowed end of the tapered bore 36 and within the bore 38 normally biases the inner sleeve 50 and the outer sleeve 34 toward their disengaged position so that the locking unit 24 can move up and down the rod 26. However, when a tensile force of a predetermined magnitude is suddenly applied to the belt 16 which tends to move the locking unit 24 upwardly, the inertia of the inner sleeve 50 causes the tapered surfaces of the two sleeves to engage one another so that the inner sleeve 50 is clamped on the rod 26 thereby providing a rigid anchor between the belt 16 and the rod 26 to prevent further extension of the belt 16. When this predetermined force is relieved from the belt 16, the spring 52 biases the two sleeves toward their disengaged condition.

Preferably the components of the locking unit 24 have a combined weight so that a downward retracting tensile force is applied to the belt 16.

Now referring to FIGURE 5, an alternate form of locking device 54 embodying the invention provides a connection between the belt 16 and the rigidly mounted rod 26 in the same manner as the locking device 24 illustrated in FIGURES 3 and 4. The locking device 54 comprises an outer sleeve 56 having an internally tapered portion 58, a cylindrical cavity 60 for mounting a spring-biased member 62 and a lower bore section 64 slidably engageable with the rod 26. The upper end of the outer sleeve 56 is closed off by a cap 66 which carries a bracket 68 securely fastened to the inner belt 16. The cap 66 and the bracket 8 have a bore 70 so that the sleeve 56, the cap 66 and the bracket 68 are slidably engaged with the rod 26 and provide a moving connection between the belt 16 and the rod 26.

An inner locking sleeve 72 similar to sleeve 50 illustrated in FIGURES 3 and 4 has radially compressible sections engaging the rod 26 and an externally tapered section 74 engageable with the internally tapered sections 58 of the outer sleeve 56. The spring 62 biases the sleeve 56 and 72 axially away from one another so that their respective tapered surfaces are normally disengaged.

A cylindrical retainer member 76 is attached by pins 78 to the inner sleeve 72. The pins 78 are disposed in slots 80 formed in sleeve 56 so that the retainer element 76 and the inner sleeve 72 are movable as a unit relative to the outer sleeve 56. A counterweight 82 is suspended from the retainer member 76. The counterweight 82 has a mass such that it imposes a tensile force through the retainer 76, the pins 78, the inner sleeve 72, the spring 62, the outer sleeve 56, the cap 66 and the bracket 68 to the belt 16 when the inner sleeve 72 and the outer sleeve 56 are in their disengaged positions. The spring 62 has a stiffness so that it normally maintains the inner sleeve 72 and the outer sleeve 56 disengaged but permits the sleeves to move toward one another when a predetermined tensile force is applied to the belt 16. When the tapered surfaces of the sleeves 72 and 56 are engaged, a predetermined force on the belt 16 acts through the components of the locking device 54 to produce a compressive force on the slotted sections of the sleeve 72 so that the locking device 54 provides a rigid clamped connection between the belt 16 and the rod 26. When this predetermined force on the belt 16 is relieved, the spring 62 disengages the sleeves 72 and 56 so that the belt 16 can be freely extended and retracted to accommodate the movements of the occupant.

It can be seen that I have described in detail an improved seat belt device for providing a connection between the end of the belt and a structural non-yielding portion of the vehicle, the connection permitting movement between the belt and the structural portion to accommodate normal movements of the occupant but forming a rigid connection between the belt and the structural portion of the vehicle when a predetermined force is applied to the belt 16 such as is produced by the sudden forces of deceleration resulting from a collision or the like.

Although I have described but two embodiments of the invention, it is to be understood that various changes and revisions can be made therein without departing from the spirit of the invention as expressed in the scope of the appended claims.

I claim:
1. In a vehicle, means providing a connection between a safety seat belt and said vehicle, comprising:
   (a) an elongated rod fixed to said vehicle;
   (b) locking means mounted on said rod, said locking means having a normal condition wherein it is slidably movable on said rod and a clamped condition wherein it is locked to said rod;
   (c) means attached to said locking means for actuating the locking means from said normal condition to said clamped condition in response to a predetermined force in a direction parallel to the axis of said rod; and
   (d) means for attaching a section of said seat belt to said actuating means so that a predetermined force applied to said section of said seat belt actuates said locking means, so that said belt section is movable relative to said vehicle when said locking means are in said normal condition and fixed relative to said vehicle when said locking means are in said clamped condition.
2. The invention as defined in claim 1, wherein said belt section is movable toward and away from a stored position and the axis of said rod is supported in a direction corresponding to the movement of said belt section relative to said stored position.
3. The invention as defined in claim 2, wherein said locking means are actuated by a force acting on said belt section to produce movement away from said stored position.
4. The invention as defined in claim 3, wherein said locking means comprises an inner sleeve having radially compressible sections mounted on said rod, said compressible sections having externally tapered surfaces, an outer sleeve coaxially mounted on said inner sleeve and having an internally tapered bore axially spaced from the tapered surfaces of said inner sleeve, and including means axially biasing said tapered bore away from said tapered surfaces.
5. The invention as defined in claim 4, wherein said bias means permit said tapered bore to engage said tapered surfaces upon the application of said predetermined force on said seat belt, the engagement of said tapered bore with said tapered surfaces being operable to compress said radially compressible sections into clamping engagement with said rod.
6. The invention as defined in claim 5, including means biasing said belt section toward said stored position.
7. The invention as defined in claim 1, wherein said rod is supported in an upright position, said belt section being movable upward from a stored position toward an extended position.
8. The invention as defined in claim 7, including retracting means applying a tensile force to said belt section, and tending to bias said locking means toward said stored position.
9. The invention as defined in claim 8, wherein said retracting means comprises a counterweight member, said counterweight member having a predetermined mass and joined to said inner sleeve to produce a downward force, and said belt section is attached to said outer sleeve so that said predetermined tensile force acting to move said belt section upwardly engages said sleeve members into a rod-clamping condition.

References Cited

UNITED STATES PATENTS

| | | | |
|---|---|---|---|
| 2,622,664 | 12/1952 | Koehler et al. | 244—122 X |
| 2,649,145 | 8/1953 | McCarthy | 244—122.2 X |
| 2,776,093 | 1/1957 | Cox et al. | 242—47.5 |
| 3,343,765 | 9/1967 | Baker | 242—107.4 |

BENJAMIN HERSH, *Primary Examiner.*

J. SIEGEL, *Assistant Examiner.*

U.S. Cl. X.R.

240—107.4; 280—150; 297—389